United States Patent
Junicke et al.

(10) Patent No.: US 7,435,285 B2
(45) Date of Patent: Oct. 14, 2008

(54) ADSORPTION MASS AND METHOD FOR REMOVING CARBON MONOXIDE FROM FLOWS OF MATERIAL

(75) Inventors: Henrik Junicke, Mannheim (DE); Markus Holzle, Kirchheim (DE); Michael Bender, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 465 days.

(21) Appl. No.: 10/526,677

(22) PCT Filed: Sep. 11, 2003

(86) PCT No.: PCT/EP03/09760

§ 371 (c)(1), (2), (4) Date: Mar. 4, 2005

(87) PCT Pub. No.: WO2004/022223

PCT Pub. Date: Mar. 18, 2004

(65) Prior Publication Data

US 2005/0241478 A1    Nov. 3, 2005

(30) Foreign Application Priority Data

Sep. 5, 2002    (DE) ................. 102 41 529

(51) Int. Cl.
*B01D 53/02*    (2006.01)

(52) U.S. Cl. ............... 95/140; 95/148; 502/345; 502/418

(58) Field of Classification Search ............ 95/140, 95/148; 502/345, 418
See application file for complete search history.

(56) References Cited

U.S. PATENT DOCUMENTS

| | | | |
|---|---|---|---|
| 3,545,915 A * | 12/1970 | Lutchko et al. | 423/247 |
| 4,552,861 A | 11/1985 | Courty et al. | |
| 4,713,090 A | 12/1987 | Yokoe et al. | |
| 4,780,481 A | 10/1988 | Courty et al. | |
| 4,835,132 A | 5/1989 | Sambrook | |
| 5,142,067 A | 8/1992 | Wegman et al. | |
| 5,328,672 A | 7/1994 | Montreuil et al. | |
| 5,475,159 A | 12/1995 | Singleton et al. | |
| 5,990,040 A * | 11/1999 | Hu et al. | 502/342 |
| 6,238,640 B1 | 5/2001 | Eguchi et al. | |
| 6,524,996 B1 | 2/2003 | Bender et al. | |
| 6,723,295 B1 | 4/2004 | Baier et al. | |
| 2002/0122764 A1 | 9/2002 | Farrauto et al. | |

FOREIGN PATENT DOCUMENTS

| | | |
|---|---|---|
| CA | 2347223 A1 | 4/2000 |
| DE | 19848595 A | 4/2000 |
| DE | 19950325 A | 4/2001 |
| EP | 0434062 A | 6/1991 |
| EP | 0804959 A | 11/1997 |
| WO | WO-9614280 A | 5/1996 |

OTHER PUBLICATIONS

International Search Report (for PCT/EP03/09760) dated Mar. 5, 2004.

* cited by examiner

*Primary Examiner*—Robert A Hopkins
(74) *Attorney, Agent, or Firm*—Connolly Bove Lodge & Hutz LLP

(57) ABSTRACT

Carbon monoxide is removed from flows of material by means of adsorption to a adsorption mass containing copper, zinc, and zirconium.

16 Claims, No Drawings

ADSORPTION MASS AND METHOD FOR REMOVING CARBON MONOXIDE FROM FLOWS OF MATERIAL

CROSS REFERENCE TO RELATED APPLICATION

The present application is a National Stage application of PCT/EP2003/009760, filed Sep. 3, 2003, which claims priority from German Patent Application No. DE 102 41 529.3, filed Sep. 5, 2002.

The present invention relates to an adsorption composition and a process for removing carbon monoxide from substance streams. In particular, the invention relates to an adsorption composition and a process for removing carbon monoxide from hydrocarbon streams.

In various sectors of industry it is important to have particularly pure substance streams available. "Pure" for the purposes of the present invention means that the substance stream is free from constituents which interfere with the specified use of the substance stream. One example is breathing air, which must be free from toxic compounds. Likewise, for instance in the production of electronic components, pure substance streams are required in order not to introduce contaminants which impair the electronic properties for the components produced; inter alia, particularly pure nitrogen or particularly pure argon is frequently required as shielding gas. Another example is catalytic chemical reactions. Catalysts are frequently very sensitive to poisonings. Since, for economic reasons, usually attempts are made to maximize the feed stream to be used per unit volume or mass of the catalyst, even extremely small amounts of impurities in the feed stream can accumulate on the catalyst and poison it. Typically, for olefin polymerization reactions on modern catalysts, for example metallocene catalysts, olefin streams are required which have contents of impurities no higher than some ppb (parts per billion, that is to say $10^{-9}$ parts of impurities per part of the substance desired) ("polymer grade" olefins). Olefins originating from typical olefin sources (steam crackers, fluid catalytic crackers, dehydrations, MTO processes ("methanol to olefins") generally have very much higher contents (ppm or even parts per thousand range) of impurities such as carbon monoxide or oxygen ("chemical grade"); these contents must be appropriately lowered before use for polymerization.

Typically, the substance streams to be purified are air, nitrogen or argon, or hydrocarbons such as ethylene, propylene, 1-butene, 2-butene, 1,3-butadiene or styrene. Typical impurities which must generally be removed are oxygen and carbon monoxide, and frequently also water, carbon dioxide, hydrogen, or else compounds of sulfur, arsenic or antimony. Processes are known for removing such impurities from substance streams.

The most well known is removing carbon monoxide from oxygen-containing gas streams, for example from breathing air. This is generally achieved by catalytically reacting carbon monoxide with oxygen, generally on copper-containing catalysts. The catalyst most used for this reaction is Hopcalite, a mixed oxide of copper and manganese which is very highly active for the reaction of carbon monoxide with oxygen and was originally developed for removing CO from breathing air in gas masks, and on which the highly toxic carbon monoxide reacts with oxygen to give carbon dioxide.

However, other uses of Hopcalite and processes for purifying substance streams other than breathing air are also known. Thus WO 98/41 597 A1 discloses a process for removing alkynes, monounsaturated or polyunsaturated hydrocarbons, sulfur compounds, antimony compounds or arsenic compounds, oxygen, hydrogen and carbon monoxide from substance streams by a sequence of two or three defined catalytic and absorptive process steps. EP 662 595 A1 teaches a process for removing hydrogen, carbon monoxide and oxygen from cold liquid nitrogen by contacting with certain zeolites or other metal oxides, in particular Hopcalite. EP 750 933 A1 discloses a similar process for removing oxygen and carbon monoxide from cold nitrogen or cold noble gases by contacting with metal oxides, in particular Hopcalite. However, at the low temperatures employed, less than −40° C., catalytic reaction does not occur, or only slightly, oxygen and carbon monoxide are adsorbed on the Hopcalite and do not react at a higher temperature unless they are removed in the cold in a desorption step. EP 820 960 A1 discloses a process also termed "adsorption" for removing oxygen and carbon monoxide from nitrogen or noble gases by contacting with metal oxides such as Hopcalite, in particular at temperatures of from 5 to 50° C. Although here also the process is described as "adsorption" of CO and $O_2$, there is no explanation as to why Hopcalite should not act here catalytically as usual, but as an adsorbent.

In these processes for removing carbon monoxide in the presence of oxygen by its reaction, carbon dioxide is formed. This can be inert in subsequent processes, or can itself be an interfering impurity. In the latter case it is removed, and various processes are also known for this. For example, CA 2 045 060 A1 teaches a process for removing carbon monoxide and oxygen from inert gas streams with subsequent removal of the carbon dioxide.

In some applications, however, carbon monoxide must be removed in a manner other than by reacting with oxygen, for example when, although carbon monoxide is present, no oxygen is, or only a stoichiometric oxygen deficit is present in the substance stream to be purified. In some applications, oxygen must be removed before the carbon monoxide, in particular when, in addition to the formation of carbon dioxide, other miscellaneous interfering byproducts can also be formed. For example, in the removal of oxygen and carbon monoxide on copper-containing catalysts from liquid hydrocarbons such as propylene, butene, butadiene or styrene, oxidation products of the hydrocarbon (termed "oxygenates") can also be formed, which are themselves interfering impurities. In such cases, the oxygen must be removed before the removal of the carbon monoxide, and carbon monoxide cannot be removed by oxidation.

In such cases carbon monoxide is therefore usually removed by distillation, but it is not possible by this means to remove CO down to residual contents in the ppb range. However, adsorption processes and adsorbents are known for this. U.S. Pat. No. 4,917,711 discloses an adsorbent which comprises a copper compound on a high-surface-area support. WO 01/7383 A1 teaches a process for purifying olefin streams by passing them over porous adsorbents such as carbon black or aluminum oxides and/or silicon oxides. JP 02 144 125 A2 (CAS Abstract 113:177 506) teaches a process for removing carbon monoxide and metal carbonyls from off-gases produced in semiconductor manufacture by adsorption to manganese oxide- and copper-oxide-containing adsorption compositions. JP 05 337 363 A2 (CAS Abstract 120:274 461) discloses adsorbents for carbon monoxide removal which comprise palladium on a support, the support comprising oxides of elements of groups IB, II (without Be, Cd, Hg and Ra), III (without Al, Tl and the actinides), IV (without C, Si, Pb and Hf), V (without N, P, As and the "Pa series"), VI (without O, S, Se and U), VIIB and the iron group from group VIII of the Periodic Table of the Elements.

WO 95/21 146 A1 teaches a process for removing carbon monoxide and, where present, also arsine from liquid hydrocarbon streams by contacting with a sorbent which comprises, depending on embodiment, disperse copper in oxidation states 0, +1 or +2, and in certain cases, also manganese dioxide. EP 537 628 A1 discloses a process for removing carbon monoxide from alpha-olefins and saturated hydrocarbons by contacting with what is called a catalyst system based on at least one oxide of a metal selected from the group consisting of Cu, Fe, Ni, Co, Pt and Pd and at least one oxide of a metal selected from the groups VB, VIB or VIIB of the Periodic Table of the Elements. WO 95/23 644 A1 teaches a copper catalyst for hydrogenating carbon oxides, for example to give methanol, or for the shift reaction of carbon monoxide with water to carbon dioxide and hydrogen, which, in addition to disperse copper, also comprises stabilizers such as silicon dioxide, aluminum oxide, chromium oxide, magnesium oxide and/or zinc oxide and optionally also a support such as aluminum oxide, zirconium dioxide, magnesium oxide and/or silicon dioxide, and teaches its activation and passivation.

However, the increasing purity requirements of substance streams for some fields of application require novel and improved aids and processes for removing impurities. A problem in particular is removing carbon monoxide from hydrocarbons, and here particularly from hydrocarbons typically present in liquid form, such as propene, 1- or 2-butene. It is an object of the present invention, therefore, to find a novel adsorption medium and a novel process for removing by adsorption carbon monoxide from substance streams.

We have found that this object is achieved by an adsorption composition which comprises copper, zinc and zirconium. In addition, processes have been found for removing carbon monoxide from substance streams that feature the use of the inventive adsorption composition as adsorption composition, but, alternatively, its use as catalyst of the reaction of carbon monoxide with oxygen, or as a reaction partner of the carbon monoxide. In particular, a process has been found for removing carbon monoxide from substance streams by adsorption, which comprises contacting the carbon-monoxide-containing substance stream with an adsorption composition which comprises copper, zinc and zirconium.

The inventive adsorption composition acts by adsorption in the inventive adsorption process. For the purposes of the present invention adsorption is the addition of an adsorbate to the surface of an adsorption composition ("adsorbent"), which is generally reversible by desorption. The adsorbate can also be chemically reacted on the adsorbent, and if the adsorbent in this case remains essentially chemically unchanged, this is termed catalysis (example: the known process for reacting CO with oxygen on a metallic copper catalyst to give carbon dioxide), and if the adsorbate reacts chemically with the adsorbent, this is termed absorption (examples: the known process for removing oxygen from gas streams by contacting with metallic copper, forming copper(I) oxide and/or copper(II) oxide; or the known process for removing carbon monoxide from gas streams by contacting with copper (I) oxide and/or copper(I) oxide, forming carbon dioxide and metallic copper). In the case of a pure adsorption, as also in the case of catalysis, the adsorbate or its reaction product is removed from the surface again by desorption; in the case of absorption, chemical regeneration of the absorbent is usually necessary. Not only in the case of catalysis but also in the case of absorption, the introductory step is in each case an adsorption, and whether an adsorption-based purification process finally meets (for example in the regeneration of the adsorption composition) a catalytic or absorption step, or whether a purely adsorption-based process is present, depends on the individual case. For the purposes of the present invention, "adsorption-based" means that during the removal of CO from the substance stream to be purified no reaction product of the carbon monoxide is released into the substance stream and the adsorption composition used remains essentially chemically unchanged, that is to say its composition does not change, or changes only insignificantly. Whether, in contrast, during the regeneration of the inventive adsorbent, carbon monoxide or a reaction product thereof is released, that is to say whether catalysis occurs or not, is unimportant for the invention.

Adsorption compositions or absorption compositions are frequently also termed "catalysts" in every day language, without their actually acting catalytically in their specified use.

The inventive adsorption composition comprises copper, zinc and zirconium. In pure form it generally comprises copper in an amount which is equivalent to at least 30% by weight, preferably at least 50% by weight, and particularly preferably at least 60% by weight, and generally no more than 99.8% by weight, preferably no more than 90% by weight, and particularly preferably no more than 80% by weight, of copper oxide CuO, in each case based on the total amount of the adsorption composition. Copper is usually present in the ready-to-use adsorption composition in part in metallic form and in part in the form of copper compounds, predominantly Cu(I) and Cu(II) oxides. The inventive adsorption composition, in pure form, generally comprises zinc in an amount which is equivalent to at least 0.1% by weight, preferably at least 5% by weight, and particularly preferably at least 10% by weight, and generally no more than 69.9% by weight, preferably no more than 40% by weight, and particularly preferably no more than 30% by weight, of zinc oxide ZnO, in each case based on the total amount of the adsorption composition. Zinc is usually present in the ready-to-use adsorption composition in the form of zinc oxide ZnO. In pure form, it further generally comprises zirconium in an amount which is equivalent to at least 0.1% by weight, preferably at least 3% by weight, and particularly preferably at least 5% by weight, and generally no more than 69.9% by weight, preferably no more than 30% by weight, and particularly preferably no more than 20% by weight, of zirconium dioxide $ZrO_2$, in each case based on the total amount of the adsorption composition. Zirconium is usually present in the ready-to-use adsorption composition in the form of zirconium dioxide $ZrO_2$. The zirconium dioxide content in the adsorption composition can in part be replaced by aluminum oxide $Al_2O_3$. For example, at least 1%, at least 10%, or at least 30%, and no more than 90%, no more than 80% or no more than 70% of the zirconium dioxide content in the adsorption composition can be replaced by aluminum oxide. "Pure form", for the purposes of the present invention, means that apart from the contents of copper(oxide), zinc oxide, and zirconium dioxide (this optionally partly replaced by aluminum oxide), no further constituents are present, apart from insignificant constituents which are still carried over from manufacture, for example, such as remains of starting materials and reagents, aids for shaping and similar. "Pure form" therefore means that the adsorption composition essentially consists of said components.

The percentage amounts of the components of the adsorption composition always total 100% by weight.

A very highly suitable adsorption composition consists, for example, in pure form of approximately 70% by weight of CuO, approximately 20% by weight of ZnO and approximately 10% by weight of $ZrO_2$, contents thereof totaling 100% by weight.

The inventive adsorption composition can, but need not necessarily be, present in pure form. It is possible to blend it with aids or to apply it to a support. Suitable supports are the known catalyst supports, for example, aluminum oxide, silicon dioxide, zirconium dioxide, aluminosilicates, clays, zeolites, kieselgur and the like.

The inventive adsorption composition is prepared as with known oxidic catalysts. A convenient and preferred process for preparing the inventive adsorption composition comprises the following process steps in said sequence:

a) preparing a solution of the components of the adsorption composition and/or of soluble starting compounds thereof;
b) precipitating a solid from this solution by adding a base;
c) separating and drying the solid;
d) optionally calcining the solid;
e) shaping the solid to give shaped bodies; and
f) optionally calcining the shaped bodies; with the proviso that at least one of the two calcination steps d) or f) is carried out.

In the first process step, step a), a solution of the components of the adsorption composition is prepared in a usual manner, for example by dissolution in an acid such as nitric acid. Optionally, instead of the components of the adsorption composition, their starting compounds can alternatively be used, for example the nitrates, carbonates, hydroxycarbonates of the metals dissolved in an aqueous solution, which can also be acidic, for example due to nitric acid. The ratio of the salts in the solution is calculated and set stoichiometrically in accordance with the desired final composition of the adsorption composition.

From this solution, in step b) a solid is precipitated as precursor for the adsorption composition. This is performed in a customary manner, preferably by increasing the pH of the solution by adding a base, for instance by adding sodium hydroxide solution or soda solution.

The resultant solid precipitated product, before the drying in step c), is generally separated off from the supernatant solution, for instance by filtering or decanting, and washed free from soluble constituents such as sodium nitrate using water. The precipitated product is then usually, before further processing, dried using customary drying methods. Generally, treatment at a slightly elevated temperature is sufficient therefor, for instance at least 80° C., preferably at least 100° C., and particularly preferably at least 120° C., for a period of from 10 min to 12 hours, preferably from 20 min to 6 hours, and particularly preferably from 30 min to 2 hours. It is also possible and particularly convenient to convert the precipitation product by spray-drying into a dry powder capable of further processing, directly—a certain alkali metal content, for example sodium content, of the adsorption composition generally does not interfere—or after washing.

Following the drying, the precipitated and dried precursor product of the adsorption composition is optionally subjected to the calcination step d). The calcination temperature used is generally at least 250° C., preferably at least 300° C., and particularly preferably at least 350° C., and also generally no more than 500° C., preferably no more than 450° C., and particularly preferably no more than 410° C. The calcination time is generally at least 10 minutes, preferably at least 20 minutes, and particularly preferably at least 30 minutes, and also generally no more than 12 hours, preferably no more than 6 hours, and particularly preferably no more than 4 hours. The drying step c) and the calcination step d) can merge directly from one into the other.

After the drying step c) or the calcination step d), the adsorption composition or its precursor is processed in the shaping step e) using customary shaping processes such as extrusion, tableting or pelletizing to give shaped bodies such as ropes or extrudates, tablets, or pellets, including spherical pellets.

After the shaping step, the adsorption composition or its precursor is optionally subjected to a calcination step f). The calcination conditions to be employed in step f) are identical to those of the calcination step d).

The adsorption composition, in the course of its preparation, is subjected to at least one of the two calcination steps d) or f), also optionally both. In the calcination step or steps, the adsorption composition precursor is converted to the actual adsorption composition and, inter alia, as usual, the BET surface area and the pore volume of the adsorption composition are also set, in which case, as is known, the BET surface area and the pore volume decrease with increasing calcination time and calcination temperature.

Preferably, calcination is performed in total at least until the carbonate (calculated as $CO_3^{2-}$) content of the adsorption composition is no more than 10% by weight, based on the total weight of the calcination product, and its BET surface area has a value in the range from at least 40 to no more than 100 $m^2/g$. The pore volume of the adsorption composition, measured as water absorption, is set during the calcination to a value of at least 0.05 ml/g. These values are preferred for the inventive adsorption composition.

The inventive adsorption composition can also, as mentioned above, be deposited on a support. This is achieved by customary impregnation processes or coating processes. As will be known, a coating process is a precipitation process in the presence of a support or a support precursor. To carry out a coating process, preferably, in the precipitation process set forth above, a support or support precursor is added to the solution prepared in step a). If the support is already in the form of preshaped finished shaped bodies, that is a pure impregnation process then is carried out the shaping step e) is omitted, otherwise the support is formed in conjunction in the course of processing the precursor product of the adsorption composition by precipitation, drying, calcination and shaping.

A preferred impregnation process for producing the inventive adsorption composition is carried out using preformed supports and comprises the following process steps in said sequence:

a) preparing a solution of the components of the adsorption composition and/or of soluble starting compounds thereof;
b) impregnating a preshaped support with this solution;
c) drying the impregnated support; and
d) calcining the impregnated dried support.

Process step a) of this impregnation process is carried out like the abovedescribed step a) of the precipitation process. In step b) a preformed support is impregnated with the solution. The preformed support has a shape chosen in accordance with the target use, for example ropes or extrudates, tablets, or pellets, including spherical pellets. The impregnation is carried out either with supernatant solution or as an impregnation with the amount of solution corresponding to the pore volume of the support ("incipient wetness"). After the impregnation the impregnated support is dried and calcined in steps c) and d), like the precipitated product in the precipitation process. Using a preshaped support, the shaping step is omitted.

The shaped adsorption composition bodies, for their use, are charged into a vessel customarily termed "adsorber", sometimes also "reactor", in which they are brought into contact with the substance stream to be purified.

The finished adsorption composition is preferably activated before its use for adsorbing CO. It is also advisable to dry it still once more before its use in order to remove traces of adhering moisture and to increase the adsorption capacity.

This further drying and the activation is conveniently carried out in the adsorber, since otherwise a higher expenditure is necessary in order to protect the ready-to-use activated adsorption composition from air and moisture when charging into the absorber.

The further drying is achieved by heating the adsorption composition to a temperature of generally at least 100° C., preferably at least 150° C., and particularly preferably at least 180° C., and generally no more than 300° C., preferably no more than 250° C., and particularly preferably no more than 220° C. A suitable drying temperature is, for example, approximately 200° C. The adsorption composition is kept at the drying temperature until interfering residues of adhering moisture are no longer present; this is generally the case at a drying time of at least 10 minutes, preferably at least 30 minutes, and particularly preferably at least 1 hour, and also generally no more than 100 hours, preferably no more than 10 hours and particularly preferably no more than 4 hours. Preferably, the drying takes place in a gas stream in order to transport the moisture away from the adsorption composition bed. For this dry air, for example, can be used, but particularly preferably an inert gas is to be passed through the adsorption composition bed in the adsorber, a suitable inert gas here is in particular nitrogen or argon.

The activation is performed by at least partial reduction to copper metal of the copper present in the adsorption composition. This can be performed in principle by any reducing agent which can reduce copper from oxidation states I or II to oxidation state 0. This can performed using liquid or dissolved reducing agents; in this case drying must be performed after the activation. Therefore, the reduction is much more convenient using a gaseous reducing agent after the drying, especially reduction using hydrogen by passing over a hydrogen-containing gas. The temperature to be used during the activation is generally at least 80° C., preferably at least 100° C., and particularly preferably at least 110° C., and also generally no more than 200° C., preferably no more than 160° C., and particularly preferably no more than 130° C. A suitable activation temperature is, for example, approximately 120° C. The reduction is exothermic. The amount of reducing agent to be fed is to be set in such a manner that the temperature does not leave the window chosen. The course of the activation can be followed on the basis of the temperature measured in the adsorption composition bed ("temperature-programmed reduction, TPR").

A preferred method of activating the adsorption composition is, following a drying carried out under a nitrogen stream, to set the desired activation temperature and add a small amount of hydrogen to the nitrogen stream. A suitable gas mixture comprises at the start, for example, at least 0.1% by volume of hydrogen in nitrogen, preferably at least 0.5% by volume, and particularly preferably at least 1% by volume, and also no more than 10% by volume, preferably no more than 8% by volume, and particularly preferably no more than 5% by volume. A suitable value is, for example, 2% by volume. This initial concentration is either maintained or increased in order to achieve and hold the desired temperature window.

The reduction is complete when, despite constant or increasing level of reducing agent, the temperature in the adsorption composition bed decreases. Preferably, the copper present in the adsorption composition is not completely reduced to metallic copper, so that the activated adsorption composition comprises not only metallic, but also oxidic, copper. A typical activation time for this case is generally at least 1 hour, preferably at least 10 hours, and particularly preferably at least 15 hours, and also generally no more than 100 hours, preferably no more than 50 hours, and particularly preferably no more than 30 hours.

If the proportion of metallic copper should become too high, the adsorption composition can also be oxidized in a similar way. For this, preferably, instead of a hydrogen/nitrogen mixture, an oxygen/nitrogen mixture is passed over the adsorption composition.

Following the activation, the inventive adsorption composition is ready for use.

The inventive adsorption process is a process for removing carbon monoxide from substance streams by adsorption which comprises contacting the carbon monoxide-containing substance stream with an adsorption composition which comprises copper, zinc and zirconium. The inventive adsorption process therefore features the use of the inventive adsorption composition. One advantage of the inventive adsorption process is its applicability to substance streams which are either oxygen-free, present at a temperature which is not high enough for the customary catalytic reaction of carbon monoxide with oxygen to form carbon dioxide, or, in their further use, interfere with carbon dioxide or oxygenates.

In principle, using the inventive adsorption process, any substance stream can be freed from contamination due to carbon monoxide, for example inert gas streams (nitrogen, helium, neon, krypton, xenon and/or argon), or hydrocarbon streams, for example alkanes (methane, ethane, propane, butane, mixtures thereof, isomers and isomer mixtures) or alkenes (also called "olefins"), such as ethene, propene, 1-butene, 2-butene, 1,3-butadiene and/or styrene.

It is equally possible to use the inventive adsorption composition in a non-adsorptive manner for removing carbon monoxide. This is advantageous, in particular, if the substance stream to be freed from carbon monoxide also comprises oxygen in addition to carbon monoxide, is at a temperature which is sufficiently high for the catalytic reaction of oxygen with carbon monoxide, and in its further use is not subject to interference by carbon dioxide or oxygenates. Thus carbon monoxide from carbon-monoxide- and oxygen-containing substance streams can be reacted to form carbon dioxide by catalytic reaction of carbon monoxide with oxygen on the inventive adsorption composition used as catalyst and thus removed from the substance stream. Equally, carbon monoxide from carbon-monoxide-containing substance streams can be removed from the substance stream by reacting carbon monoxide with a copper(I)- and/or copper(II)-oxide-containing inventive adsorption composition, with formation of metallic copper, to form carbon dioxide. In the same manner it is possible to remove oxygen from substance streams by absorption to the inventive metallic-copper-containing adsorption composition, forming copper(I) oxide and/or copper(II) oxide. In other words, the inventive adsorption composition can be used in all known processes in which copper-containing solids are used catalytically, in absorption processes, or as reaction partners.

Preferably, the inventive adsorption process is used for removing carbon monoxide from alkene streams, in particular for removing carbon monoxide from alkene streams which are usually liquid. Liquid alkenes, apart from the use of unusually high pressures, typically do not have the temperature necessary for the catalytic removal of carbon monoxide by reaction with oxygen, and in addition, in the subsequent use for polymerization, the formation of oxygenated compounds would interfere.

The inventive adsorption process is particularly suitable for removing carbon monoxide from propene, 1-butene, 2-butene, 1,3-butadiene, butene mixtures, butene/butadiene mixtures, or styrene, in order to decrease the carbon monoxide content to the values permitted for "polymer grade" olefins. In a highly particularly preferred embodiment, carbon monoxide is removed from liquid propene by adsorption using the inventive process.

The inventive adsorption process makes it possible to remove carbon monoxide from substance streams. It is particularly suitable for removing carbon monoxide from substance streams which generally comprise at least 0.001 ppm (in the case of gases ppm by volume, in the case of liquids ppm by weight), preferably at least 0.01 ppm, and generally no more than 1000 ppm, preferably no more than 100 ppm, and particularly preferably no more than 10 ppm, of carbon monoxide. For relatively high initial concentrations of carbon monoxide it is usually more economical to carry out in advance another known purification process such as distillation, catalytic oxidation of the carbon monoxide with oxygen to form carbon dioxide, or oxidation of the carbon monoxide with copper oxide, forming metallic copper and carbon dioxide, optionally with subsequent removal of carbon dioxide and oxygenated compounds, since otherwise the adsorption capacity of the adsorption composition can be reached too quickly.

To carry out the inventive adsorption process, the substance stream to be freed from carbon monoxide in the adsorber is passed over the bed of the inventive adsorption composition shaped bodies.

The temperature for the inventive adsorption process is, from the technical aspect, not critical, or only slightly critical. Typical temperatures are in the range of at least −270° C., preferably at least −100° C., and particularly preferably −40° C., and no more than 300° C., preferably no more than 200° C., and particularly preferably no more than 100° C. In a convenient manner, the temperature is not influenced separately, but the temperature which the substance stream to be treated has is employed.

The essential parameter which determines the degree of depletion, apart from the temperature which is not separately influenced in a convenient manner, as described, is the contact time between substance stream and adsorption composition. This contact time is determined by the velocity of the substance stream and the volume of the adsorption composition bed. Usually the volumetric flow of the substance stream to be purified is predetermined by the capacity of upstream or downstream installations. In addition, the adsorption capacity of the adsorption composition is limited, so that a certain amount of adsorption composition can only be used for the inventive process for a certain period before it has to be regenerated. Although this first makes it desirable to use as large an amount as possible of adsorption composition, this is opposed, however, by the costs which increase with the adsorber size. The amount of adsorption composition in the adsorber is therefore chosen in the individual case in such a manner as to achieve, firstly, the desired degree of depletion, and secondly a tolerably short operating time of an adsorber between two regenerations of the adsorption composition. Advantageously, at least two adsorbers are provided, of which at least one can receive the substance stream to be purified, while the adsorption composition in at least one other is regenerated. This is a routine optimization task for a person skilled in the art.

Depending on the adsorber size selected, the maximum uptake capacity for carbon monoxide of the adsorption composition present therein is reached sooner or later, so that it has to be regenerated.

To regenerate the inventive adsorption composition, first the substance stream to be purified is shut off; preferably it is passed into a parallel adsorber packed with fresh or regenerated adsorption composition.

The adsorption composition to be regenerated is then regenerated by desorption. It is not important whether, before the desorption, the adsorbed carbon monoxide is reacted catalytically with any oxygen adsorbed, or reacted purely chemically by reaction with copper oxide present in the adsorption composition to form carbon dioxide, or reacted in another manner, for instance with any hydrogen present to form methanol or methane, and these reaction products then desorb; what is important is the restoration of the adsorption capacity of the adsorption composition.

The desorption is carried out by passing over a fluid, preferably a gas, by increasing the temperature, or by a combination of these measures. Preferably, a gas is passed through the adsorber containing the adsorption composition to be regenerated, and heated in the course of this. The gas can be inert, for example nitrogen, methane or argon, but it is also possible to use hydrogen, and in this case the CO is reacted to form methanol or methane. The desorption temperature is generally set to a value of at least 50° C., preferably at least 100° C., and particularly preferably at least 150° C., and also generally no more than 400° C., preferably no more than 350° C., and particularly preferably no more than 300° C. For example, a desorption temperature of approximately 220° C. is suitable. The regeneration time is typically generally at least 1 hour, preferably at least 10 hours, and particularly preferably at least 15 hours, and also generally no more than 100 hours, preferably no more than 50 hours, and particularly preferably no more than 30 hours.

Following this regeneration, the adsorption composition is generally immediately ready for reuse. In an individual case, especially if the desired proportion of metallic copper has changed compared with freshly activated adsorption composition, it can be advisable or necessary to subject the adsorption composition to a repeated activation.

It is possible using the inventive adsorption composition and the inventive adsorption process to remove carbon monoxide from substance streams simply and economically. The substance streams thus purified can then be used in accordance with specifications.

We claim:

1. A process for removing carbon monoxide from carbon-monoxide-comprising substance streams by adsorption to an adsorption composition, which comprises bringing the carbon-monoxide-comprising substance stream into contact with a copper-, zinc- and zirconium-comprising adsorption composition, which essentially consists of copper in an amount equivalent to from 30 to 99.8% by weight of CuO, zinc in an amount equivalent to from 0.1 to 69.9% by weight of ZnO and zirconium in an amount equivalent to from 0.1 to 69.9% by weight of $ZrO_2$, in each case based on the total amount of the adsorption composition, the proportions of the individual components totaling 100% by weight.

2. A process as claimed in claim 1, wherein an adsorption composition is used in which copper is present in part in metallic form and in part in the form of copper(I) oxide and/or copper(II) oxide, zinc is present in the form of zinc oxide and zirconium is present in the form of zirconium dioxide.

3. A process as claimed in claim 1, wherein carbon monoxide is removed from a liquid propylene stream.

4. A process as claimed in claim 1, wherein carbon monoxide is removed from a carbon-monoxide- and oxygen-comprising substance stream and part of the carbon monoxide is removed by catalytic reaction of the adsorption composition with oxygen.

5. A process as claimed in claim 1, wherein a copper(I)-oxide- and/or copper(II)-oxide-comprising adsorption composition is used and part of the carbon monoxide is removed by chemical reaction with said copper oxides.

6. A process as. claimed in claim 1, wherein the adsorption composition is activated by treatment with a reducing agent.

7. A process as claimed in claim 6, wherein the adsorption composition is activated by being contacted with a hydrogen-comprising-gas.

8. A process as claimed in claim 1, wherein the adsorption composition is regenerated after reaching its adsorption capacity by heating it to a temperature in the range from 50 to 400° C. and/or passing a gas through a bed of the adsorption composition to be regenerated.

9. A process claimed in claim 1, wherein an adsorption composition is used in which copper is present in part in metallic form and in part in the form of copper(I) oxide and/or copper(II) oxide, zinc is presenting the form of zinc oxide and zirconium is present in the form of zirconium dioxide.

10. A process as claimed in claim 1, wherein an adsorption composition is used in which copper is present in part in metallic form and in part in the form of copper(I) oxide and/or copper(II) oxide, zinc is present in the form of zinc oxide and zirconium is present in the form of zirconium dioxide.

11. A process as claimed in claim 4, wherein a copper(I)-oxide-and/or copper(II)-oxide-comprising adsorption composition is used and part of the carbon monoxide is removed by chemical reaction with said copper oxides.

12. A process as claimed in claim 4, wherein the adsorption composition is activated by treatment with a reducing agent.

13. A process as claimed in claim 5, wherein the adsorption composition is activated by treatment with a reducing agent.

14. A process as claimed in claim 4, wherein the adsorption composition is regenerated after reaching its adsorption capacity by heating it to a temperature in the range from 50 to 400° C. and/or passing a gas through a bed of the adsorption composition to be regenerated.

15. A process as claimed in claim 5, wherein the adsorption composition is regenerated after reaching its adsorption capacity by heating it to a temperature in the range from 50 to 400° C. and/or passing a gas through a bed of the adsorption composition to be regenerated.

16. An adsorption composition, which essentially consists of copper, copper(I) oxide and /or copper(II) oxide in an amount equivalent to from 30 to 99.8% by weight of CuO, zinc in an amount equivalent to from 0.1 to 69.9% by weight of ZnO and zirconium in an amount equivalent to from 0.1 to 69.9% by weight of $ZrO_2$, in each case based on the total amount of the adsorption composition, the proportions of the individual components totaling 100% by weight.

* * * * *